United States Patent
Bargmann et al.

(10) Patent No.: US 7,022,408 B2
(45) Date of Patent: *Apr. 4, 2006

(54) ORIENTED ACRYLIC HOTMELTS (75) Inventors: Renke Bargmann, Hamburg (DE);
Marc Husemann, Hamburg (DE);
Stephan Zöllner, Hamburg (DE)

(73) Assignee: tesa AG, Hamburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/312,124

(22) PCT Filed: Jun. 13, 2001

(86) PCT No.: PCT/EP01/06682

§ 371 (c)(1),
(2), (4) Date: May 12, 2003

(87) PCT Pub. No.: WO02/02709

PCT Pub. Date: Jan. 10, 2002

(65) Prior Publication Data
US 2004/0038061 A1    Feb. 26, 2004

(30) Foreign Application Priority Data
Jun. 30, 2000 (DE) ................ 100 31 868
Jul. 13, 2000 (DE) ................ 100 34 069

(51) Int. Cl.
*B32B 27/30* (2006.01)
*B32B 31/28* (2006.01)
*C08L 33/08* (2006.01)

(52) U.S. Cl. .................. 428/355 AC; 428/523; 525/191; 525/221; 525/242; 525/298; 525/301; 526/72; 526/317.1

(58) Field of Classification Search .......... 525/55, 525/59, 191, 221, 242, 298, 301, 329.7; 526/72, 526/317.1; 523/300; 428/523; 156/325, 156/326, 327, 334
See application file for complete search history.

(56) References Cited
U.S. PATENT DOCUMENTS

| | | | |
|---|---|---|---|
| 4,619,979 A | 10/1986 | Kotnour et al. | 526/88 |
| 5,866,249 A | 2/1999 | Yarusso et al. | 428/355 |
| 5,876,855 A * | 3/1999 | Wong et al. | 428/355 BL |
| 6,103,316 A | 8/2000 | Tran et al. | 427/505 |
| 6,703,441 B1 * | 3/2004 | Husemann et al. | 524/558 |
| 2003/0136237 A1 * | 7/2003 | Storbeck et al. | 83/13 |
| 2003/0143413 A1 * | 7/2003 | Storbeck et al. | 428/500 |

OTHER PUBLICATIONS

U.S. Appl. No. 10/415,215: copending application filed Sep. 18, 2003.*
Ta-Hua Yu and Garth L. Wilkes, "Orientation determination and morphological study of high density polyethylene (HDPE) extruded tubular films; effect of processing variables and molecular weight distribution," Polymer, vol. 37, No. 21, 1996, pp. 4675-4687.
Abstract of Japanese Patent Application JP 63278129, filed Nov. 2, 1988.
Abstract of Japanese Patent Application JP 07113993 A, filed Oct. 20, 1983.

* cited by examiner

*Primary Examiner*—Michael J. Feely
(74) *Attorney, Agent, or Firm*—Norris McLaughlin & Marcus PA (57) ABSTRACT

A pressure sensitive adhesive obtainable by free-radical polymerization, characterized in that at least 65% by weight of the adhesive is based on at least one acrylic monomer from the group of the compounds of the following general formula:

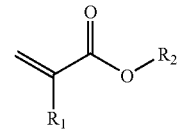

where $R_1$=H or $CH_3$ and the radical $R_2$=H or $CH_3$ or is selected from the group consisting of branched or unbranched saturated alkyl groups having 2–20 carbon atoms, the average molecular weight of the adhesive is at least 65,000, applied to a carrier, the adhesive possesses a preferential direction, where the refractive index measured in the preferential direction $n_{MD}$ is greater than the refractive index measured in a direction perpendicular to the preferential direction $n_{CD}$, the difference $\Delta n = n_{MD} - n_{CD}$ being at least $1 \cdot 10^{-5}$.

7 Claims, 2 Drawing Sheets

Figure 1

Detailed representations from Figure 1

Figure 2

ORIENTED ACRYLIC HOTMELTS

The invention relates to oriented polyacrylate pressure-sensitive adhesives (PSAs) having anisotropic properties.

BACKGROUND OF THE INVENTION

As a result of ever-increasing environmental obligations and cost pressure, there is at present a trend toward preparing PSAs with little if any solvent. This objective can most easily be realized by means of hotmelt technology. A further advantage is the reduction in production time. Hotmelt lines can laminate adhesives much more quickly to carriers or release paper, and so can save time and money.

However, the hotmelt technology always imposes stringent requirements on the adhesives. For high-grade industrial applications, particular preference is given to polyacrylates, on account of their transparency and stability to weathering.

In order to prepare acrylic hotmelts, conventionally, acrylic monomers are polymerized in solution and the solvent is then removed in the extruder in a concentrating process. Besides the advantages in transparency and weathering stability, however, acrylate PSAs are also required to meet exacting requirements in the shear strength field. This is achieved by means of polyacrylates of high molecular weight and high polarity with subsequent efficient crosslinking.

For the properties of PSAs, the orientation of the macromolecules also plays an important part. During the preparation, further processing, or subsequent (mechanical) stressing of polymers or polymer compositions, there may be high degrees of orientation of the macromolecules in preferential directions within the polymer assembly as a whole. This orientation may lead to special properties in the corresponding polymers. Some examples of properties which can be influenced by the degree of orientation include the strength and stiffness of the polymers and of the plastics produced from them, thermal conductivity, thermal stability, and anisotropy in respect of permeability to gases and liquids.

One important property dependent on the orientation of the monomer units is the refraction of light (expressed by the corresponding refractive index n) and the retardation δ.

From the standpoint of process engineering, advantages are afforded by electron beam crosslinking. For example, it is possible to "freeze in" certain states by the crosslinking process.

The retention of the partial orientation in partially crystalline rubber adhesives has already been described in U.S. Pat. No. 5,866,249. As a result of the anisotropic adhesive properties, innovative PSA applications were defined.

It is an object of the invention to provide oriented polyacrylate compositions which possess a sufficient lifetime of the anisotropic state and which by virtue of their orientation possess properties which are favorable in respect of their use as pressure sensitive adhesives, in particular in respect of their adhesive properties. A further object is to offer a process for preparing such pressure sensitive adhesives.

SUMMARY OF THE INVENTION

The present invention provides a pressure sensitive adhesive obtainable by free-radical polymerization, where
at least 65% by weight of the adhesive is based on at least one acrylic monomer from the group of the compounds of the following general formula:

where $R_1$=H or $CH_3$ and the radical $R_2$=H or $CH_3$ or is selected from the group consisting of branched or unbranched saturated alkyl groups having 2–20 carbon atoms,
the weight average molecular weight ($M_W$) of the adhesive is at least 650,000,
applied to a carrier, the adhesive possesses a preferential direction, where the refractive index measured in the preferential direction $n_{MD}$ is greater than the refractive index measured in a direction perpendicular to the preferential direction $n_{CD}$, the difference $\Delta n = n_{MD} - n_{CD}$ being at least $1 \cdot 10^{-5}$.

The free radical polymerization may be conducted in the presence of an organic solvent or in the presence of water or in mixtures of organic solvents and water or without solvent. It is preferred to use as little solvent as possible. The polymerization time, depending on conversion and temperature, is between 6 and 48 h.

In the case of solution polymerization, preferred solvents used are esters of saturated carboxylic acids (such as ethyl acetate), aliphatic hydrocarbons (such as N-hexane or n-heptane), ketones (such as acetone or methyl ethyl ketone), special-boiling-point spirit, or mixtures of these solvents. For polymerization in aqueous media or in mixtures of organic and aqueous solvents, It is preferred to add the emulsifiers and stabilizers which are known to the skilled worker for this purpose to the polymerization. Polymerization initiators used are customary free-radical-forming compounds such as, for example, peroxides, azo compounds, and pemxosulfates. Mixtures of initiators may also be used. During polymerization it is possible to use further regulators for reducing the molecular weight and lowering the polydispersity. As so-called polymerization regulators it is possible, for example, to use alcohols and ethers. The weight average molecular weight ($M_W$) of the acrylic PSAs is advantageously between 650.000 and 2.000.000 g/mol, more preferably between 700.000 and 1.000.000 g/mol.

In one particularly advantageous embodiment of the inventive pressure sensitive adhesives, the radical $R_2$ is chosen from the group of branched or unbranched saturated alkyl groups having 4–9 carbon atoms.

As nonexclusive examples of alkyl groups which may find preferential application for the radical $R_2$, mention may be made below of butyl, pentyl, hexyl, heptyl, octyl, isooctyl, 2-methylheptyl, 2-ethylhexyl, nonyl, decyl, dodecyl, lauryl, or stearyl(meth)acrylate or (meth)acrylic acid.

In a further very advantageous embodiment of the inventive pressure-sensitive adhesive, the monomers used include vinyl compounds containing functional groups, in a fraction of 0–35 percent by weight. In this sense, acrylic compounds containing functional groups also come under the designation "vinyl compound". Vinyl compounds of this kind containing functional groups are maleic anhydride, styrene, styrene compounds, vinyl acetate, meth(acrylamides), N-substituted (meth)acrylamides, β-acryloyloxypropionic acid, vinyl acetic acid, fumaric acid, crotonic acid, aconitic acid, dimethylacrylic acid, trichloroacrylic acid, itaconic acid, vinyl acetate, hydroxyalkyl (meth)acrylate, aminocontaining (meth)acrylates, hydroxy-containing (meth)acrylates, with particular preference to 2-hydroxyethyl (meth) acrylate, 2-hydroxypropyl (meth)acrylate, and/or 4-hydroxybutyl (meth)acrylate, and photoinitiators functionalized with double bond; the above list is only exemplary and not conclusive.

Also claimed is a process for preparing oriented acrylic pressure sensitive adhesives, which is outstandingly suitable in particular for preparing the inventive pressure sensitive adhesives. This process is distinguished by the following steps:

polymerizing a mixture comprising at least one vinyl-, acrylic- or methacrylic-based monomer or a combination of these monomers, the average molecular weight of the resulting polymers being more than 650,000, subsequently extrusion coating the polymer composition, subsequently crosslinking the polymer composition on the carrier by irradiation with electron beams.

DETAILED DESCRIPTION

Extrusion coating takes place preferably through an extrusion die. The extrusion dies used may originate from one of the following three categories: T-dies, fishtail dies, and coathanger dies. The individual types differ in the design of their flow channel. For producing oriented acrylic pressure sensitive adhesives it is particularly preferred to carry out coating onto a carrier using a coathanger die, specifically in such a way that a polymer layer is formed on the carrier by means of a movement of die relative to carrier. The time which elapses between coating and crosslinking is advantageously very short, preferably not greater than 10 s.

By the shaping of the acrylic hotmelt in the coathanger die and its emergence from the die with a defined film thickness, by the drawing of the PSA film to a thinner film thickness on transfer to the carrier material, and by the subsequent inline crosslinking, the orientation is obtained.

For the invention, it is particularly advantageous if the composition of the corresponding monomers is chosen such that the resultant adhesives possess pressure-sensitively adhering properties in accordance with D. Satas [Handbook of Pressure Sensitive Adhesive Technology, 1989, Verlag VAN NOSTRAND REINHOLD, New York]. For this purpose, the glass transition temperature of the acrylic PSA should be below 25° C.

The free radical polymerization may be conducted in the presence of an organic solvent or in the presence of water or in mixtures of organic solvents and water or without solvent. It is preferred to use as little solvent as possible. The polymerization time, depending on conversion and temperature, is between 6 and 48 h.

In the case of solution polymerization, preferred solvents used are esters of saturated carboxylic acids (such as ethyl acetate), aliphatic hydrocarbons (such as N-hexane or n-heptane), ketones (such as acetone or methyl ethyl ketone), special-boiling-point spirit, or mixtures of these solvents. For polymerization in aqueous media or in mixtures of organic and aqueous solvents, it is preferred to add the emulsifiers and stabilizers which are known to the skilled worker for this purpose to the polymerization. Polymerization initiators used are customary free-radical-forming compounds such as, for example, peroxides, azo compounds, and peroxosulfates. Mixtures of initiators may also be used. During polymerization it is possible to use further regulators for reducing the molecular weight and lowering the polydispersity. As so-called polymerization regulators it is possible, for example, to use alcohols and ethers. The molecular weight of the acrylic PSAs is advantageously between 650.000 and 2.000.000 g/mol, more preferably between 700.000 and 1.000.000 g/mol.

In one preferred procedure the polymerization is conducted in polymerization reactors which in general have been provided with a stirrer, two or more feed vessels, reflux condenser, heating and cooling, and which are equipped for operating under $N_2$-atmosphere and superatmospheric pressure.

Following polymerization in solvent, the polymerization medium can be removed under reduced pressure, this operation being conducted at elevated temperatures in the range, for example, of from 80 to 150° C. The polymers can then be used in the solvent-free state, particularly as hotmelt PSAs. In certain cases it is also an advantage to prepare the polymers of the invention without solvent.

In order to prepare the acrylic PSAs, the polymers may undergo conventional modification. By way of example it is possible to add tackifying resins, such as terpene resins, terpene-phenolic resins, C5, C9 and C5/C9 hydrocarbon resins, pinene resins, indene resins or rosins, alone or in combination with one another. It is also possible, furthermore, to use plasticizers, various fillers (e.g., fibers, carbon black, zinc oxide, titanium dioxide, solid microbeads, solid or hollow glass beads, silica, silicates, chalk, non-blocked isocyanates, etc.), aging inhibitors, light stabilizers, ozone protectants, fatty acids, plasticizers, nucleators, blowing agents and/or accelerators as additives. In addition it is possible to admix crosslinkers and crosslinking promoters. Examples of suitable crosslinkers for electron beam crosslinking are difunctional or polyfunctional acrylates, difunctional or polyfunctional isocyanates or difunctional or polyfunctional epoxides.

The straight or blended acrylic hotmelts are coated onto a carrier by means of a die with a variable slot width and are then cured on the carrier with electron beams. Carrier materials suitable in principle include BOPP, PET, nonwoven, PVC, foam, or release papers (glassine, HDPE, LDPE). Crosslinking takes place in inline operation immediately after the PSA has been applied to the carrier.

The orientation of the adhesive can be measured using a polarimeter, using infrared dichroism or using x-ray scattering. The measurements have shown that the orientation in acrylic PSAs in the uncrosslinked state is retained only for a few days. Within the rest period or storage time, the system relaxes and loses its preferential direction. By immediate electron beam crosslinking after coating through the die, this effect can be significantly reinforced. Relaxation of the orientated polymer chains converges toward zero, and the orientated PSAs can be stored for a very long time period without losing their preferential direction.

The extent of the orientation within the acrylic PSAs is dependent both on the nozzle temperature and coating temperature and on the temperature of the carrier material. The best orientation effects are obtained by deposition onto a cold surface. Consequently, the carrier material should be cooled directly by means of a roller during coating. The roller can be cooled by a liquid film from the outside or inside or by a coolant gas. Furthermore, the coating temperature and die temperature ought to be lowered in order to obtain a high degree of orientation. The degree of orientation is freely adjustable by way of the width of the die gap. The thicker the PSA film expressed from the extrusion die, the greater the extent to which the adhesive can be drawn to a thinner PSA film on the carrier material. This drawing operation is freely adjustable not only by virtue of the freely adjustable die width but also by the web speed of the receiving carrier material. The adhesive is oriented by the coating operation.

The anisotropy may also be generated subsequently by stretching an acrylic pressure sensitive adhesive on an extensible carrier.

EXPERIMENTS

The process of the invention is described below by means of experiments. The following test methods have been employed in order to evaluate the technical adhesive properties of the PSAs prepared.

Test Methods

180° Bond Strength Test (Test A)

A strip, 20 mm wide, of an acrylic pressure-sensitive adhesive coated onto a polyester or siliconized release paper was applied to steel plates. Depending on direction and drawing, longitudinal or transverse specimens were bonded to the steel plate. The PSA strip was pressed onto the substrate twice using a 2 kg weight. The adhesive tape was then immediately peeled from the substrate at an angle of 180° and at 30 mm/min. The steel plates were washed twice with acetone and once with isopropanol. The results are reported in N/cm and are averaged from three measurements. All measurements were conducted at room temperature under controlled-climate conditions.

Measurement of the Birefringence (Test B)

Version 1

Two crossed polaroid filters were placed in the sample beam of a Uvikon 910 spectrophotometer. Oriented acrylates were fixed between two slides. The film thickness of the oriented sample was determined from preliminary experiments by means of thickness gauges. The sample thus prepared was placed in the measuring beam of the spectrophotometer with its direction of orientation deviating in each case by 45° from the optical axes of the two polaroid filters. The transmission, T, was then monitored over time by means of a time-resolved measurement. The transmission data were then used to determine the birefringence in accordance with the following relationship:

$T = \sin^2(\tau \times R)$ where $R$=retardation.

The retardation R is made up as follows:

$$R = \frac{d}{\lambda} \Delta n$$

where d=sample thickness.

The transmission is also given from $$T = \frac{I_t}{I_0}$$

This ultimately provides, for the birefringence:

$$\Delta n = \frac{\lambda}{\pi d} \arcsin \sqrt{T}$$

Version 2

The birefringence was measured with an experimental setup such as that described analogously in the Encyclopedia of Polymer Science, John Wiley & Sons, vol. 10, p. 505, 1987 as a circular polariscope. The light emitted by a diode-pumped solid-state laser of wavelength λ=532 nm is first of all linearly polarized by a polaroid filter and then circularly polarized using a λ/4 plate with λ=532 nm. The laser beam thus polarized is then passed through the oriented acrylate composition. Since acrylate compositions are highly transparent, the laser beam is able to pass through the composition virtually unhindered. Where the polymer molecules of the acrylate composition are oriented, this results in a change in the polarizability of the acrylate composition depending on observation angle (birefringence). As a result of this effect, the E vector of the circularly polarized laser beam undergoes a rotation about the axis of progression of the laser beam. After departing the sample, the laser beam thus manipulated is passed through a second λ/4 plate with λ=532 nm whose optical axis deviates by 900 from the optical axis of the first λ/4 plate. This filter is followed by a second polaroid filter which likewise deviates by 90° from the first polaroid filter. Finally, the intensity of the laser beam is measured using a photosensor, and Δn is determined as described under Version 1.

Determination of the Gel Fraction (Test C)

After careful drying, the solvent-free adhesive samples are welded into a pouch made of polyethylene nonwoven (Tyvek nonwoven). The gel index is determined from the difference in the sample weights before and after extraction with toluene.

Measurement of the Tensile Stress/Elongation Behavior (Test D)

Strips of the specimens with a width of at least 30 mm and a length of 50 mm were laminated to form a sample element, and to give a thickness of at least 0.5 mm. Any air inclusions were very substantially avoided. The resulting laminate was cut to a width of exactly 20 mm and the ends of the strips were bonded to paper. The length of the sample piece between the paper strip ends was exactly 25 cm. The thickness of the strip was subsequently determined to an accuracy of 10 μm using a thickness gauge.

The sample element obtained in this way was then subjected to a tensile stress/elongation measurement with the assistance of a universal testing machine (from Frank). The forces measured were in each case specified as tension in relation to the initial cross section. The relative elongations relate to the original length of 25 mm. The test speeds set were 100, 300, and 600 mm/min.

Measurement of the Shrinkback (Test E)

Strips with a width of at least 30 mm and a length of 20 cm were cut parallel to the coating direction of the hotmelt.

At application rates of 130 or 50 μm², 3 or 8 strips respectively were laminated to one another, in order to give comparable layer thicknesses. The specimen obtained in this way was then cut to a width of exactly 20 mm and was overstuck at each end with paper strips, with a spacing of 15 cm. The test specimen thus prepared was then suspended vertically at RT and the change in length was monitored over time until no further shrinkage of the sample could be found. The initial length reduced by the final value was then reported, relative to the initial length, as the shrinkback, in percent.

For measuring the orientation after a longer time, the coated and oriented pressure sensitive adhesives were stored in the form of swatches for a prolonged period, and then analyzed.

PREPARATION OF THE SAMPLES

Example 1

A 200 L reactor conventional for radical polymerizations was charged with 2500 g of acrylic acid, 47.5 g of 2-ethylhexyl acrylate and 30 kg of acetone/isopropanol (97:3). After nitrogen gas had been passed through for 45 minutes with stirring, the reactor was heated to 58° C. and 20 g of 2,2-azoisobutyronitrile (AIBN) were added. The external heating bath was then heated to 75° C. and the reaction was carried out constantly at this external temperature. After a reaction time of 1 hour a further 20 g of AIBN were added. After 5 hours and 10 hours, in each case 15 kg of acetone/isopropanol (97:3) were added for dilution. The reaction was terminated after a reaction time of 48 hours and the system was cooled to room temperature. The product was coated from solution at 130 g/m² using a coating bar onto a primed polyester backing, and dried at 120° C. in a drying oven for 10 minutes, lined with siliconized release paper and finally irradiated with electron beams, with a dose of 40 kGy and an acceleration voltage of 230 kV. Analysis was carried out using test methods A, B and C.

For the hotmelt coatings, the solvent was removed in a concentrating extruder.

Example 2

Preparation took place as in Example 1. For the polymerization, use was made of 5000 g of acrylic acid, 45 kg of 2-ethylhexyl acrylate and 30 kg of acetone/isopropanol (97:3). In the further course of the polymerization, the identical amounts of solvent and initiator were used. The specimens were irradiated with electron beams in a dose of 30 kGy. Analysis was carried out using test methods A, B and C.

Example 3

Preparation took place as in Example 1. For the polymerization, use was made of 3500 g of acrylic acid, 36.5 kg of 2-ethylhexyl acrylate, 10 kg of methyl acrylate and 30 kg of acetone/isopropanol (97:3). In the further course of the polymerization, the identical amounts of solvent and initiator were used. The specimens were irradiated with electron beams in a dose of 30 kGy. Analysis was carried out using test methods A, B and C.

Example 4

Preparation took place as in Example 1. For the polymerization, use was made of 3000 g of acrylic acid, 35.5 kg of 2-ethylhexyl acrylate, 7.5 kg of methyl acrylate, 4 kg of N-tert-butylacrylamide and 30 kg of acetone/isopropanol (97:3). In the further course of the polymerization, the identical amounts of solvent and initiator were used. The specimens were irradiated with electron beams in a dose of 30 kGy. Analysis was carried out using test methods A, B and C.

Example 5

Preparation took place as in Example 1. For the polymerization, use was made of 3500 g of acrylic acid, 20.75 kg of 2-ethylhexyl acrylate, 20.75 kg of butyl acrylate, 5 kg of methyl acrylate and 30 kg of acetone/isopropanol (97:3). In the further course of the polymerization, the identical amounts of solvent and initiator were used. The specimens were irradiated with electron beams in a dose of 50 kGy. Analysis was carried out using test methods A, B and C.

Example 6

Drawing of the Acrylic Hotmelts, Specimens A–L

To produce specimens A–L, Example 4 was concentrated in a drying extruder and coated through a die having a 300 μm (specimens A–F) or 780 μm (G–L) slot width onto a siliconized release paper carrier, at 130 g/m².

The web speed of the carrier was 80 m/min. For specimens A–C and G–I the release paper carrier was passed together with the PSA film over a chill roll at 25° C. In the case of specimens D–F and J–L, this roll was heated to 90° C. To investigate the relaxation behavior, specimens A, D, G and J were subjected immediately after coating, in an inline operation, to crosslinking with electron beams, with a dose of 30 kGy and an accelerating voltage of 230 kV EBC. Specimens B, E, H and K were stored at room temperature for an hour after coating and then subjected to electron beam crosslinking with identical process parameters. Specimens C, F, I and L were stored at room temperature for 48 hours after coating and then subjected to electron beam crosslinking with identical process parameters. Analysis of all of the specimens was carried out using test methods A, B and C.

Example 7

(Specimen 1#)

The procedure of Example 6 was repeated. The PSA used was that of Example 1. Coating takes place through a 300 μm die at an application rate of 130 g/m², a chill roll temperature of 25° C. (external temperature of the steel roll on which the carrier material is coated), and a web speed of 80 m/min. Crosslinking was carried out with electron beams in a dose of 40 kGy, and analysis was carried out using test methods A, B, C, D and E.

Example 8

(Specimen 2#)

The procedure of Example 6 was repeated. The PSA used was that of Example 2. Coating takes place through a 300 μm die at an application rate of 130 g/m², a chill roll temperature of 25° C., and a web speed of 80 m/min.

Crosslinking was carried out with electron beams in a dose of 30 kGy, and analysis was carried out using test methods A, B, C, D and E.

Example 9

(Specimen 3#)

The procedure of Example 6 was repeated. The PSA used was that of Example 3. Coating takes place through a 300 μm die at an application rate of 130 g/m$^2$, a chill roll temperature of 25° C., and a web speed of 80 m/min. Crosslinking was carried out with electron beams in a dose of 30 kGy, and analysis was carried out using test methods A, B, C, D and E.

Example 10

(Specimen 5#)

The procedure of Example 6 was repeated. The PSA used was that of Example 5. Coating takes place through a 300 μm die at an application rate of 130 g/m$^2$, a chill roll temperature of 25° C., and a web speed of 80 m/min. Crosslinking was carried out with electron beams in a dose of 50 kGy, and analysis was carried out using test methods A, B, C, D and E.

Results

In order to investigate the orientation of acrylic PSAs and their crosslinkability, first of all a variety of acrylic PSAs were prepared by free radical polymerization. In terms of temperature stability and flow viscosity, all of the adhesives can be processed by the hotmelt process. The acrylic PSAs prepared were polymerized in solution and then concentrated in a drying extruder. The comonomer composition of the individual adhesives is listed in Table 1.

TABLE 1

Comonomer composition of the individual acrylic PSAs

| Example | 2-EHA | BA | MA | NTBAM | AA |
|---|---|---|---|---|---|
| 1 | 95 | 0 | 0 | 0 | 5 |
| 2 | 90 | 0 | 0 | 0 | 10 |
| 3 | 73 | 0 | 20 | 0 | 7 |
| 4 | 71 | 0 | 15 | 8 | 6 |
| 5 | 41.5 | 41.5 | 10 | 0 | 7 |

2-EHA: 2-Ethylhexyl acrylate
BA: Butyl acrylate
MA: Methyl acrylate
NTBAM: N-tert-butylacrylamide
AS: Acrylic acid The average molecular weight of Examples 1–5 was approximately 800,000 g/mol. As reference specimens, Examples 1–5 were applied from solution onto a primed polyester film at 130 g/m$^2$, dried at 120° C., cured with electron beams, and then subjected to adhesive testing. For an assessment of the efficiency of crosslinking, the gel index of the adhesives was measured. The gel index expresses the insoluble fraction of the PSA in toluene. Additionally, the instantaneous bond strengths on steel were measured. The results of the tests are set out in Table 2.

TABLE 2

Adhesive testing of the reference specimens

| Example | Electron beam dose [kGy] | Gel index [%] | BS steel [N/cm] |
|---|---|---|---|
| 1 | 40 | 65 | 6.5 |
| 2 | 30 | 55 | 6.0 |
| 3 | 30 | 56 | 5.9 |
| 4 | 30 | 59 | 6.1 |
| 5 | 50 | 72 | 6.5 |

BS: Bond strength on steel

The gel indices vary between 55 and 72%—depending on comonomer composition and dose.

As a result of the relatively high fraction of polar monomers, the adhesives are cohesive and therefore possess relatively low instantaneous bond strengths on steel over approximately 6–6.5 N/cm. Measurements in cross and machine directions gave virtually the same bond strengths within the bounds of measurement error. Measurement of the birefringence showed no orientation within the adhesives. No difference in polarizability in cross and machine directions was found.

To investigate the orientation effect, examples 1–5 were concentrated in a drying extruder to form 100% systems and were coated through a die at different slot widths.

In order to produce oriented acrylic hotmelts, the PSA was preoriented within the die by means of the flow process. The adhesive film is subsequently transferred to the carrier material at a defined film thickness. For setting the film thickness, a defined draw ratio between die width and film thickness is necessary. This effect can be reinforced by increasing the coating speed (web speed of the receiving carrier material). Through the ratio of die gap width to film thickness of the adhesive on the carrier material it is possible to vary freely the extent of orientation of the polymer chains.

For experimental confirmation, the adhesives were coated with different draw ratios and other experimental parameters. To minimize the relaxation time, the PSA was crosslinked with electron beams in an inline operation after coating. The relaxation times were therefore well below 10 s. Supplementary experiments have shown that orientations are still detectable after 48 hours. These experiments were conducted with Example 4 using the optimum draw ratio, the optimum temperature of the coating roller, and the point in time of inline crosslinking. The experiments are summarized in Table 3.

TABLE 3

Experimental parameters relating to orientation of adhesive 4

| Specimen | Draw ratio | Roller temperature [° C.] | Point in time of crosslinking | Δn |
|---|---|---|---|---|
| A | 1:2.3 | 25 | 2 s | $9.3 \cdot 10^{-5}$ |
| B | | | 1 h | $4.2 \cdot 10^{-5}$ |
| C | | | 48 h | $6.6 \cdot 10^{-6}$ |
| D | | 90 | 2 s | $3.4 \cdot 10^{-5}$ |
| E | | | 1 h | $7.8 \cdot 10^{-6}$ |
| F | | | 48 h | — |
| G | 1:6 | 25 | 2 s | $1.0 \cdot 10^{-4}$ |
| H | | | 1 h | $5.6 \cdot 10^{-5}$ |
| I | | | 48 h | $8.3 \cdot 10^{-6}$ |

TABLE 3-continued

Experimental parameters relating to orientation of adhesive 4

| Specimen | Draw ratio | Roller temperature [° C.] | Point in time of crosslinking | Δn |
|---|---|---|---|---|
| J | | 90 | 2 s | $7.4 \cdot 10^{-5}$ |
| K | | | 1 h | $9.7 \cdot 10^{-6}$ |
| L | | | 48 h | — |

Δn: Difference between the refractive index $n_{MD}$ in the direction of stretching and the refractive index $n_{CD}$ perpendicular thereto.

The draw ratio was set by varying the nozzle width. The application rate remained constant at 130 g/m². The specimens were in each case irradiated with an electron beam dose of 30 kGy. All of the specimens drawn are listed alphabetically.

The orientation within the acrylic PSAs was determined by quantifying the birefringence. The refractive index n of a medium is given by the ratio of the speed of light $c_0$ in a vacuum, to the speed of light c in the medium in question viz ($n=c_0/c$), n being a function of the wavelength of the respective light. As a measure of the orientation of the PSA, use is made of the difference Δn between the refractive index measured in a preferential direction (stretching direction, machine direction MD), $n_{MD}$, and the refractive index measured in a direction perpendicular to the preferential direction (cross direction, CD), $n_{CD}$. In other words, $\Delta n = n_{MD} - n_{CD}$; this figure is obtainable through the measurements described in Test B.

All specimens showed orientation of the polymer chains. The Δn values found are listed in Table 3, with the greatest orientation being measured for specimen G ($\Delta n = 1.0 \cdot 10^{-4}$). For Specimen A, which was not drawn to such a great extent, a Δn of $9.3 \cdot 10^{-5}$ was found.

The corresponding Δn figure is dependent on the comonomer composition and on the degree of branching of the polymer. For the polymers illustrated here, the PSA is oriented in accordance with the invention when the Δn figure is $>1 \cdot 10^{-5}$.

Orientation within the acrylic PSAs to the degree indicated above was therefore demonstrated for the samples measured through the measurement of the birefringence.

The consequences for the technical adhesive properties are depicted in Table 4:

TABLE 4

| Specimen | Gel index [%] | BS-steel MD [N/cm] | BS-steel CD [N/cm] |
|---|---|---|---|
| A | 61 | 5.2 | 6.7 |
| B | 59 | 5.8 | 6.4 |
| C | 59 | 6.1 | 6.2 |
| D | 59 | 6.3 | 6.6 |
| E | 60 | 6.0 | 6.4 |
| F | 56 | 6.1 | 6.0 |
| G | 63 | 4.9 | 6.9 |
| H | 62 | 5.9 | 6.5 |
| I | 60 | 6.0 | 6.1 |
| J | 62 | 5.8 | 6.7 |
| K | 59 | 5.9 | 6.4 |
| L | 58 | 6.0 | 6.0 |

Application rate 130 g/m²
BS: Bond strength on steel;
MD (machine direction; stretching direction);
CD (cross direction, transverse direction)

For specimens A and G, with reference to the bond strengths for MD (machine direction; stretching direction) longitudinal direction, in which the PSA was drawn)) and for CD (cross direction, transverse direction, perpendicular to MD), only relatively small differences in bond strength were measured, the low values being measured in each case for MD. The gel indices after electron beam crosslinking also showed relatively little fluctuation with the degree of orientation. The greatest orientations were achieved with a short relaxation time and a cold coating roller.

In order to ensure universal applicability, further acrylic hotmelts having different comonomer compositions were coated from the melt.

The results of technical adhesive testing are set out in Table 5.

TABLE 5

| Specimen | Electron beam dose [kGy] | Gel index [%] | BS-steel MD [N/cm] | BS-steel CD [N/cm] | Δn |
|---|---|---|---|---|---|
| 1# | 40 | 72 | 5.8 | 6.8 | $1.5 \cdot 10^{-4}$ |
| 2# | 30 | 62 | 5.7 | 6.4 | $0.8 \cdot 10^{-4}$ |
| 3# | 30 | 61 | 5.5 | 6.2 | $1.2 \cdot 10^{-4}$ |
| 5# | 50 | 75 | 5.9 | 6.7 | $0.6 \cdot 10^{-4}$ |

Application rate 130 g/m²
BS: Bond strength on steel;
MD (machine direction; stretching direction);
CD (cross direction, transverse direction)
Δn: Difference in the refractive indices $n_{MD}$ in the stretching direction and perpendicular thereto $n_{CD}$.

The tests on the drawn specimens show that, generally speaking, acrylic PSAs having anisotropic adhesive properties can be produced by shaping the PSA in an extrusion die, subjecting it to severe drawing during coating, and subsequently "freezing in" this state by electron beam irradiation. The Δn figures determined for specimens 1#, 2#, 3# and 5# are at approximately the same level as that of specimen G. For specimens 1#, 2#, 3# and 5#, only relatively small differences in the bond strengths for machine direction and cross direction were measured. In turn, relatively low bond strengths were measured in the stretching direction (MD).

Figure 1:
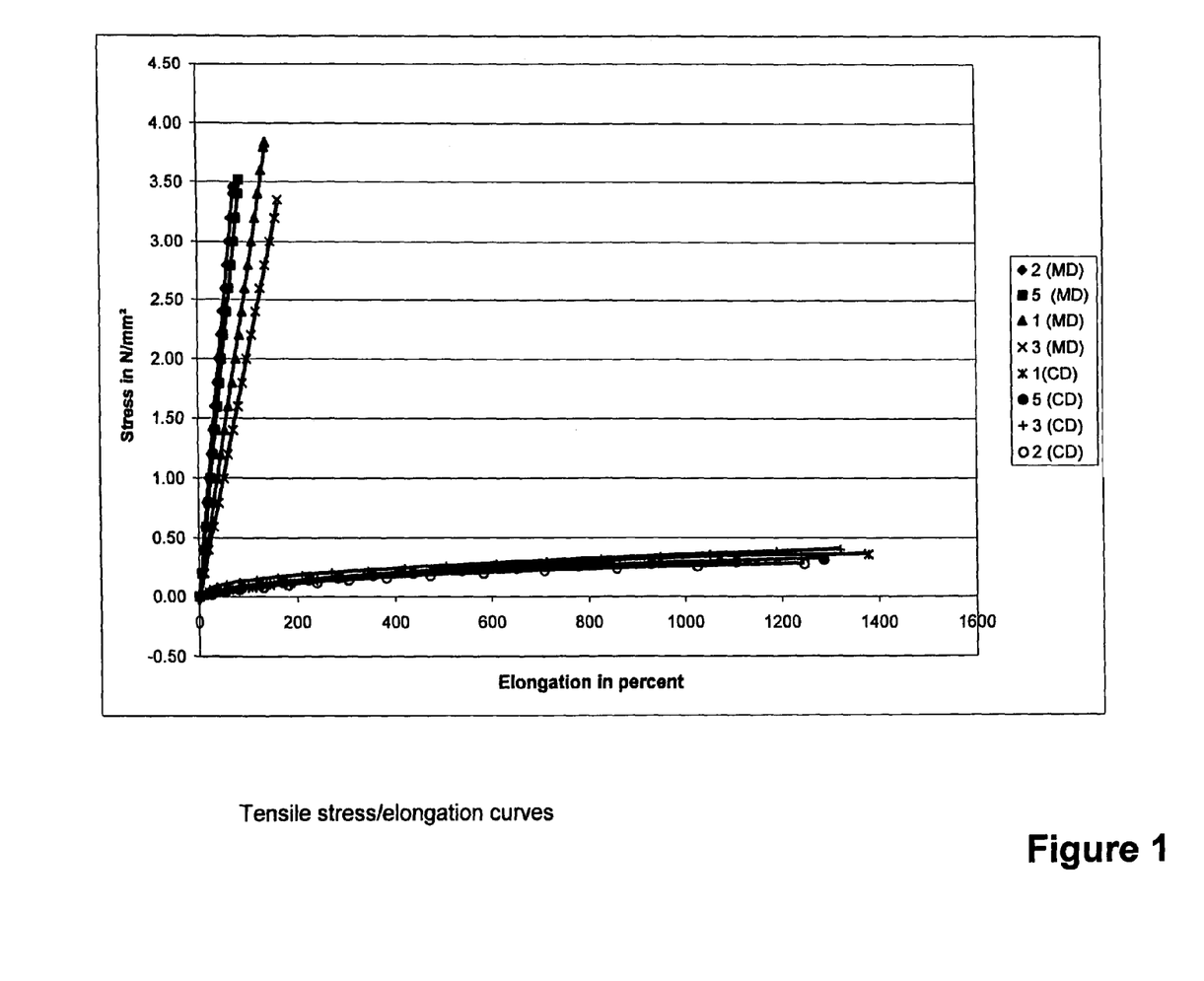
FIG. 1 illustrates the tensile stress/elongation curves for the specimens shown in Table 5.
Figure 2:
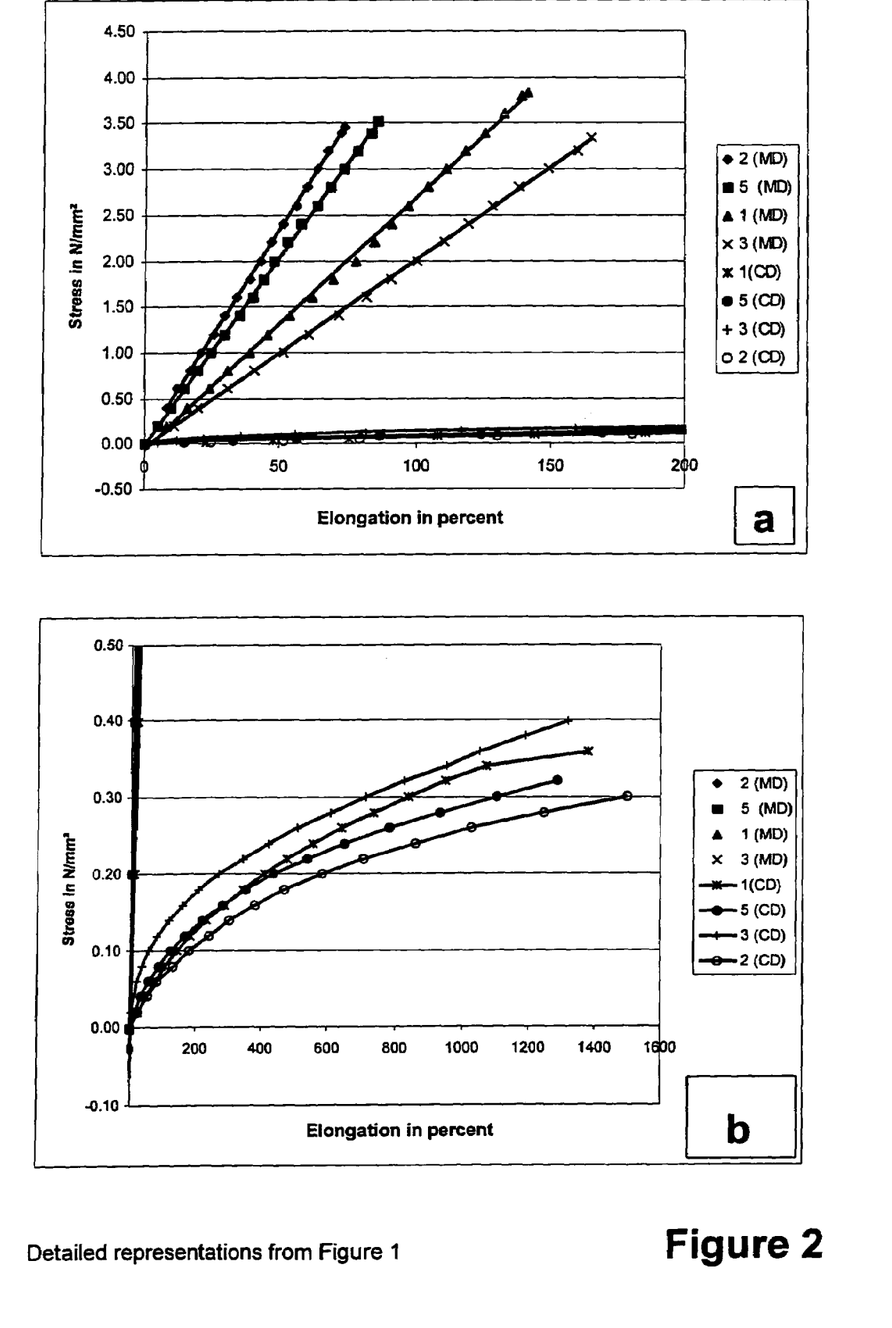
FIG. 2 illustrates the tensile stress/elongation curves for the specimens shown in Table 5, but at different scales than FIG. 1.

In contrast, tensile stress/elongation measurements show a marked effect of the orientation on the physical properties of the PSAs. FIGS. 1 and 2 show the tensile stress/elongation curves of specimens 1#, 2#, 3# and 5#.

Specimens 1#, 2#, 3# and 5# exhibit a significantly lower level of elongation following orientation in the direction of stretching (MD). The stress rises rapidly even over a very short length, and the specimens tear. In the cross direction (CD), examples can be stretched further at well above 1000% elongation and possess significantly lower tensile strength in this direction.

For the technical adhesive application of these oriented PSAs, the shrinkback is a decisive factor. Oriented adhesives have a tendency, after stretching in a given direction, to move back to the initial state as a result of their "entropy-elastic" behavior. In order to record this problem analytically, the shrinkback of the oriented specimens was measured.

The values determined at room temperature are listed in Table 6.

TABLE 6

| Specimen | Shrinkback [%] |
|---|---|
| 1# | 91 |
| 2# | 95 |

TABLE 6-continued

| Specimen | Shrinkback [%] |
|---|---|
| 3# | 93 |
| 5# | 90 |

Application rate 130 g/m²

The values were in each case determined after storage for 1 week. Furthermore, the severe shrinkback of all of the oriented specimens illustrates the propensity of the PSA to return to the original state. By electron beam crosslinking it is possible to freeze in the orientation. Specimens 1#, 2#, 3# and 5# were crosslinked in Table 7 with the electron beam doses depicted, and then the shrinkback of these PSAs was determined after storage for 2 months.

TABLE 7

| Specimen | Electron beam dose [kGy] | Shrinkback [%] |
|---|---|---|
| 1# | 40 | 89 |
| 1# | 0 | −25 |
| 2# | 30 | 94 |
| 2# | 0 | −5 |
| 3# | 30 | 92 |
| 3# | 0 | 0 |
| 5# | 50 | 90 |
| 5# | 0 | −8 |

Application rate 130 g/m²

Table 7 demonstrates that the electron beam crosslinking froze in the orientation and, through the shrinkback, this orientation can be utilized for product applications even after storage for 2 months. Comparison with the uncrosslinked specimens in each case illustrates that the PSAs relax without crosslinking and hence the shrinkback is no longer in existence. On the contrary, with some of the samples a slight extension is in fact observed during measurement, which can be attributed to the force of gravity acting on the suspended samples.

For product applications, the shrinkback can be accelerated further by the effect of temperature. In Table 8, the shrinkback of the specimens is measured as a function of temperature and time.

TABLE 8

| Specimen | Time [h]/temperature [° C.] | Shrinkback [%] |
|---|---|---|
| 1# | 2/40 | 72 |
| 1# | 2/60 | 78 |
| 2# | 3/40 | 76 |
| 2# | 3/60 | 81 |
| 3# | 2/40 | 70 |
| 3# | 3/60 | 82 |
| 5# | 2/40 | 73 |
| 5# | 2/60 | 80 |

Application rate 130 g/m²

As a result of the temperature treatment, the shrinkback is substantially accelerated. With thermal conditioning at 60° C., the samples obtain a shrinkback of more than 80% after just a relatively short time (3 h) and hence approach a figure which is otherwise only achieved on storage for several days. This effect can be utilized preferentially in the case of stress-free adhesive bonds on convex surfaces.

Taking into account these results, it is possible to realize new pressure-sensitive adhesive tape products which make use of this described effect. When adhesive bonds are made on cable harnesses in the engine compartment, the temperature differences which occur are in some cases very high. It is therefore preferred to use acrylic PSA tapes for such applications. In contrast to a customary commercial acrylic adhesive, an oriented adhesive will contract on heating, by the shrinkback measured and described, and so will form a firm bond from the cables and the insulating nonwoven. The advantages are retained in relation to the oriented natural rubber adhesives, these advantages being, for example, higher temperature stability in a large temperature window, and improved aging stability.

The shrinkback effect may also be utilized in the case of adhesive bonds on convex surfaces. By applying a pressure-sensitive adhesive tape to a convex surface, with subsequent heating, the PSA tape contracts and so conforms to the convexity of the substrate. In this way, adhesive bonding is greatly facilitated and the number of air inclusions between substrate and tape is greatly reduced. The PSA is able to exert its optimum effect. This characteristic can be assisted further by an oriented carrier material. Following application, under heating, both the carrier material and the oriented PSA shrink, so that the bonds on the convexity are completely stress-free.

The pressure-sensitive adhesives of the invention likewise offer a wide range for applications which utilize advantages of the low extension in the longitudinal direction and the possibility of shrinkback in an advantageous way.

The property of the pre-extension of the pressure-sensitive adhesives can also be utilized to outstanding effect. A further exemplary field of use for such highly oriented acrylic PSAs is that of strippable double-sided adhesive bonds. Unlike conventional strippable products, the oriented PSA is already pre-extended to several 100%, so that in order to remove the double-sided bond the acrylic PSA need only be stretched by a few percent more in the stretching direction (MD). With particular preference, these products are produced as acrylic hotmelts with a film thickness of several 100 μm. Straight acrylics are used with particular preference. As compared with conventional systems (multilayer systems, SIS adhesives), the oriented acrylic strips are transparent, stable toward aging, and inexpensive to manufacture.

We claim:

1. A pressure sensitive adhesive, oriented and crosslinked in the oriented state,
comprising a polymer at least 65% of which is made up of at least one acrylic monomer selected from the group consisting of monomers of the following formula:

where $R_1$=H or $CH_3$ and the radical $R_2$=H or $CH_3$ or is selected from the group consisting of branched or unbranched saturated alkyl groups having 2–20 carbon atoms,
the weight average molecular weight ($M_w$) of the polymer is at least 650,000,
the refractive index of the adhesive, measured in the oriented direction $n_{MD}$ is greater than the refractive index measured in a direction perpendicular to the oriented direction $n_{CD}$, the difference $\Delta n = n_{MD} - n_{CD}$ being at least $1 \cdot 10^{-5}$.

2. The adhesive as claimed in claim 1, wherein said alkyl groups have 4–9 carbon atoms.

3. The adhesive as claimed in claim 1, wherein said monomer make-up of said polymer further comprises up to 35% by weight of one or more vinyl compounds selected from the group consisting of vinyl esters, vinyl halides, vinylidene halides and nitriles of ethylenically unsaturated hydrocarbons.

4. The adhesive as claimed in claim 1, further comprising aging inhibitors, light stabilizers, ozone protectants, fatty acids, plasticizers, nucleators, blowing agents, accelerators or combinations thereof.

5. The adhesive as claimed in claim 1, further comprising difunctional or polyfunctional acrylates or methacrylates, difunctional or polyfunctional isocyanates or difunctional or polyfunctional epoxides.

6. An adhesive tape comprising a carrier coated on one or both sides with the pressure sensitive adhesive of claim 1, 2, 3, 4 or 5.

7. A process for preparing oriented acrylic pressure sensitive adhesives, comprising the steps of:

polymerizing a mixture comprising at least one vinyl-, acrylic- or methacrylic monomer or a combination of said monomers, the weight average molecular weight ($M_W$) of the resulting polymers being more than 650,000, subsequently extrusion coating the polymer composition onto a carrier, subsequently crosslinking the polymer composition on the carrier by irradiation with electron beams.

* * * * *